United States Patent [19]

Rockandel et al.

[11] Patent Number: 5,314,527

[45] Date of Patent: May 24, 1994

[54] MERCURY CONTAMINATED MUD TREATMENT

[76] Inventors: Michael A. Rockandel, 5195 Turquoise Dr., Richmond, British Columbia, Canada; Larry G. Twidwell, c/o Montana Enviromet, Inc., 601 S. Clark, Butte, Mont. 59701

[21] Appl. No.: 52,655

[22] Filed: Apr. 26, 1993

Related U.S. Application Data

[63] Continuation-in-part of Ser. No. 875,100, Apr. 28, 1992, Pat. No. 5,209,774.

[51] Int. Cl.$^5$ .................................................. C22B 43/00
[52] U.S. Cl. ....................................................... 75/742
[58] Field of Search ......................................... 75/742

Primary Examiner—Peter D. Rosenberg
Attorney, Agent, or Firm—Barrigar & Oyen

[57] ABSTRACT

This invention relates to a hydrometallurgical process for the treatment of mercury contaminated muds. More particularly, this process pertains to a hydrometallurgical process for the treatment of Environmental Protection Agency designated K106 muds discharged from a mercury chlor-alkali plant. A hydrometallurgical process for the treatment of mercury containing solids comprising: (a) treating the solids in a first leach with acid and sodium hypochlorite to produce a leached product; (b) transferring the product from the first leach to a first washing thickener and thickening the leached product from the first leach; (c) transferring the underflow from the wash thickener to a second leach and treating the underflow product with acid and sodium hypochlorite to yield a second leached product; (d) transferring the product from the second leach to a second washing thickener and thickening the leached product from the second leach; and (e) transferring the product from the second wash thickener to a final dewatering process to yield a low mercury content.

47 Claims, 8 Drawing Sheets

MERCURY CONTAMINATED MUD TREATMENT

This application is a continuation-in-part of application Ser. No. 07/875,100, filed Apr. 28, 1992, now U.S. Pat. No. 5,209,774.

FIELD OF THE INVENTION

This invention relates to a hydrometallurgical process for the treatment of low mercury content wastes and lo mercury contaminated materials. In one aspect, this process pertains to a hydrometallurgical process for the treatment of Environmental Protection Agency designated K106 muds discharged from a mercury chlor-alkali plant.

BACKGROUND OF THE INVENTION

Mercury has become recognized as a non-benign environmental pollutant. Materials and wastes can be contaminated by mercury from a number of sources including chemical spills and decommissioned chlor-alkali plants.

A significant but decreasing percentage of the world's chlorine and caustic soda comes from mercury amalgam cell chlor-alkali plants. These plants produce contaminated wastewater and sediments which must be treated to remove the contaminants before disposal to the environment. A common practice is to treat the wastewater with a combination of acidification and sulfidation to remove soluble mercury as mercuric sulfide. The wastewater is clarified prior to disposal while the solids containing mercuric and mercurous compounds as well as metallic mercury have in the past been disposed of in a hazardous landfill. The mercury content of the solids can vary significantly but is typically 1-6% wt. total mercury.

Recently, the United States Environmental Protection Agency (EPA) has enacted a number of new rules which regulate the disposal of industrial waste streams. The rule making procedure has identified special hazardous waste streams such as the chlor-alkali plant mercury contaminated wastewater treatment filter cake designated as K-106. The K-106 material is classified as a high mercury sub-category waste and will in the future be banned from land fill disposal.

The EPA has designated retort/roasting as the standard treatment technology (Best Demonstrated Available Technology BDAT) for treating K-106 material. The technology is well established, having been used extensively for the recovery of mercury from cinnabar ores and for the purification of contaminated mercury (triple distillation). There are, however, numerous problems associated with retorting of low concentration K-106 filter cakes. The most significant are:

1. The condenser recovery of mercury vapour from the low concentration retorter off-gas is poor.
2. The condensed mercury is contaminated with sulfur and carbonaceous material thereby making further refining to triple distilled quality difficult.
3. The high temperature chloride containing off-gas is highly corrosive.
4. The sulfur must be recovered from the off-gas.
5. The retort facility is expensive in terms of capital and operating cost.

U.S. Pat. No. 3,639,118, O'Grady, discloses a method for purifying mercury contaminated with metallic components (notably iron and calcium). Specifically, mercury materials having impurities therein are contacted with "nascent" chlorine in an aqueous phase capable of generating nascent chlorine so that the metal impurities are solubilized into the aqueous phase. Thereafter, the aqueous phase is removed, leaving behind relatively pure mercury. In a preferred embodiment, the O'Grady process involves the use of ". . . a mineral acid and an oxychloride salt e.g., sodium hypochlorite . . ." (col. 1, lines 39-40) which are reacted in the presence of the mercury.

After the mercury is treated in the O'Grady process using the above-identified chemical system, it is thereafter separated and washed with water. In the alternative, washing may be accomplished simultaneously with separation as stated in column 1, lines 59-60.

In essence, O'Grady teaches a technique for purifying metallic mercury that is contaminated with other metallic components. O'Grady's objective is to remove the impurities in the mercury, thereby leaving behind the pure mercury. This is different from a process where the objective is to remove both mercury and mercury compounds from a solids matrix to yield an uncontaminated matrix which is free of mercury and mercury compounds.

U.S. Pat. No. 5,013,358, granted May 7, 1991, Ball et al., discloses and claims a method for the recovery of mercury from mercury-containing material. In the process, insoluble mercury or mercury salts in mercury-containing material are converted into a soluble form by controlled chlorination. The soluble forms of mercury in the chlorination solution are reduced with iron, preferably iron powder, to yield elemental mercury. After separation from the reduced solution, the solids from the reduction containing entrained mercury, are subjected to a separation procedure for the separation and quantitative recovery of substantially pure mercury. Separation by elutriation through a body of mercury is preferred. Prior to separation, the reduction solids may be kneaded for coalescence of fine mercury particles, followed by slurrying of the kneaded material. Any selenium in the reduced solution may be recovered in a reduction with a suitable reductant, preferably by adding strong sulfuric acid in the presence of the ferrous chloride formed in the preceding reduction, and excess sulfur dioxide. The process is carried out at ambient conditions. The amount of liquid in the process is controlled. Substantially no mercury is discharged from the process in residues, or residual liquid.

The Ball et al. process utilizes chlorination in order to convert the insoluble mercury salts or mercury into soluble forms. Ball et al. do not disclose or teach concentrating mercury containing muds (K106 muds), treating the concentrated muds with acid and sodium hypochlorite in order to leach the muds, and then subsequently concentrating the mercury containing materials further before passing the materials through a second leach of acid and sodium hypochlorite. Ball et al. also do not teach a countercurrent mud treatment process using overflow from the first and second leaches.

SUMMARY OF THE INVENTION

The invention is directed to a hydrometallurgical process for the removal of mercury and mercury compounds from solid materials containing mercury and mercury compounds comprising: (a) treating the solid materials in a leach with acid, sodium chloride and sodium hypochlorite for a sufficient length of time to produce a leached product having a reduced mercury and mercury compound content and a by-product having an elevated mercury and mercury compound content; and (b) washing and de-watering the leach product to yield a residue which is low in mercury content, and a wash fluid which is delivered to a treating tank.

In the process, the underflow from the wash facility can be transferred to a second leach wherein the underflow product is treated with acid and sodium hypochlorite to yield a second leached product. The product from the second leach can be transferred to a second washing facility following which the washed product is dewatered to produce a residue with a lowered mercury content. The first and second washing facilities can be wash thickeners.

The overflow from the second washing facility or the second wash thickener can be recycled to the first wash thickener as the washing fluid or to the first leach facility. The overflow from the first wash thickener can be treated with iron, and then filtered, to yield a mercury containing cement. The cementation filtrate can be recycled to process. A portion of the cement product filtrate can be recycled to the second washing facility or the wash thickener. This low mercury stream is an effective washing solution but also transfers iron to the second leach which allows sodium hypochlorite addition to the acidic solution with minimal chlorine off-gassing. The remaining cement product solution can be transferred to a sulfide reactor system for treatment prior to disposal.

The overflow from the first washing facility or the wash thickener can alternatively be treated in an electrolysis cell to produce liquid elemental mercury at the cathode and chlorine gas at the anode. The liquid mercury can be withdrawn from the cell on a batch or continuous basis. The mercury depleted electrolysis solution can be utilized for residue washing in the first or second washing facilities or wash thickeners or can be transferred to the sulfide reactor for mercury removal prior to disposal.

The mercury containing solids can be first passed through a solids concentration device such as a thickener or cyclone before being transferred to the first leach. The overflow from the concentration device can be filtered, backflushed, and the filtered product can then be recycled to the concentration device.

The retention time of the first leach can be at least 15 minutes, conducted at a pH of about 6, and a solution potential of at least 900 mv. The retention time of the second leach can be at least 15 minutes, conducted at a pH of about 2, with a solution potential of at least 700 mv and a sodium chloride level at least about 5%. The temperature can be about 50° C.

The invention also pertains to a hydrometallurgical process for the treatment of mercury containing solids and liquids comprising: (a) treating the mercury containing solids and liquids in a sulfide reactor with acid and sodium sulfide to produce a product; (b) transferring the product from the sulfide reactor to a concentration device to produce a thickened product; (c) transferring the thickened product from the high concentration device to a first leach, to which is added acid, and sodium hypochlorite to produce a first leached product; (d) transferring the first leached product from the first leach to a first countercurrent wash thickener to produce a wash thickened product; (e) transferring the wash thickened product from the first wash thickener to a second leach, to which acid and sodium hypochlorite is added to produce a second leached product; (f) transferring the second leached product from the second leach to a second countercurrent wash thickener to produce a second wash thickened product; and (g) washing the second wash thickened product from the second wash thickener to yield a low mercury containing residue.

The overflow from the second wash thickener can be transferred to the first wash thickener or to the first leach.

The overflow from the first wash thickener can be treated with iron in a cementation process, the resulting product being filtered to yield a mercury containing cement, the filtrate from the filter being recycled in part to the second wash thickener. The filtrate from the filter can be recycled in part to the first leach. A part of the filtrate from the filter can be recycled in part to the sulfide reactor. The overflow from the first wash thickener can alternatively be treated with an electrolysis device to produce liquid elemental mercury.

Overflow from the sulfide reactor product concentration device can be transferred to a backflushed Adams filter, the filtered product from the Adams filter being returned to the thickener.

Often the mercury containing mud is found to have either a low mercury content or the mercury is found to be more easily leached. In these cases, the leaching can be accomplished in a single leaching stage. Following the leaching step the leach product can be either transferred to a counter-current washing thickener or can be directly processed in a washing and dewatering device such as a filter press or a vacuum filter.

BRIEF DESCRIPTION OF THE DRAWINGS

In drawings which illustrate specific embodiments of the invention but which should not be construed as restricting the spirit or scope of the invention in any way.

DETAILED DESCRIPTION OF SPECIFIC EMBODIMENTS OF THE INVENTION

The applicant has invented a hydrometallurgical process for the treatment of mercury containing K106 muds. The process can achieve a measure of performance equivalent to that achievable by the retorting of K106 muds.

Continued testwork into the mercury recovery process has led to several process improvements and an increased areas of application for the technology. The key areas of improvement are:

1. The technology can be used to treat low mercury content wastes and mercury contaminated materials such as might be generated by the spill of a mercury chemical or at a decommissioned chlor-alkali plant, or soil contaminated with mining waste or activated carbon impregnated catalyst.

2. An earlier version of the process involved a two-stage, counter-current leach for the treatment of K106 mud. While the two-stage leach has been found effective on all contaminated materials tested, it has been discovered that in certain situations a simplification to a single-stage leach is possible.

3. The use of a tray wash thickener is disclosed in the earlier process. While generally desirable, the tray wash thickener is not essential. The multi-stage wash thickener can be replaced by a conventional washing and dewatering device such as a vacuum filter or a filter press. It is, however, essential that a multi-stage wash consisting of first brine and then water be incorporated in the process.

4. The earlier version of the process recovers mercury by cementation. We have learned that in certain situations it may be desirable for the chlor-alkali facility or, in fact, any user of the technology, to recover mercury from the leach solution by other techniques, including the transfer of the solution to some other processing unit such as a chlor-alkali plant's brine treatment system with mercury subsequently recovered in the amalgam process, or the electrolysis of the leach solution to generate an elemental mercury product.

5. The cementation process has been modified. It is now possible with the other processes disclosed to remove elemental mercury from the reactor rather than from an iron-mercury mixture.

The processes disclosed herein utilize three potential routes for the recovery of mercury. These alternative routes are presented in FIGS. 1A to 1C which illustrate two-stage leach with tray thickener washing, FIGS. 2A to 2C which illustrate single-stage leach, FIG. 3 which illustrates equipment flow-sheet with two-stage leach and counter-current tray thickener washing and FIG. 4 which illustrates single-stage leach with conventional dewatering.

Figure 1A:
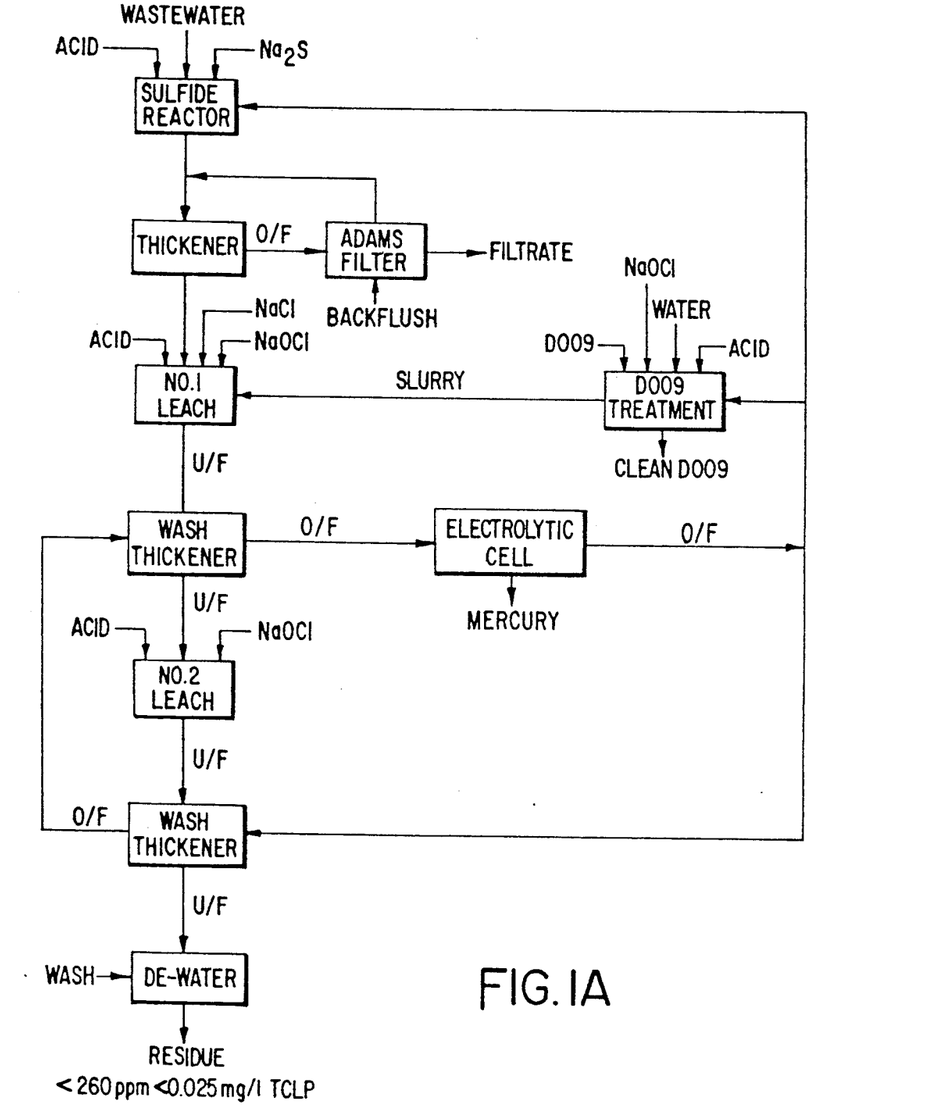
FIG. 1A represents a block diagram flow-sheet of one embodiment of the mercury mud treatment process involving two leach stages, two washing stages and removal of mercury by electrolysis.

Referring to FIG. 1A, which represents a block diagram flow-sheet depiction of one embodiment of the mercury containing mud treatment process of the invention, the process operates as follows:

1. Waste water slurry from a sulfide reactor wherein the wastewater has been treated with acid and sodium sulfide is clarified in a thickener. The thickener splits the stream into an overflow which passes on to an Adams tube filter and an underflow mud (K106) which is transferred to a first leach.

2. The suspended solids in the overflow from the thickener are captured in the Adams tube filter and are then backflushed to the feed side of the thickener.

3. The underflow mud (K106) from the thickener is directed to the first leach wherein a primary leach, with a retention time of about 60 minutes, is conducted at a pH=6 controlled by the addition of either HCl or $H_2SO_4$. The solution potential of the leach is raised to at least 900 mv by the addition of sodium hypochlorite. Leading temperatures are between about 20° to 100° C., preferably about 50° C. Sodium chloride in the leach solution can be about 5–27% wt. preferably about 10% wt.

4. The leach product from the first leach is passed to and thickened in a counter-current washing thickener. The overflow solution from the thickener is directed to an electrolytic cell while the settled underflow solids are transferred to a second leach.

5. The overflow solution from the washing thickener is treated in the electrolytic cell wherein elemental mercury is removed from the solution.

6. The mercury barren overflow solution obtained from the electrolytic cell can be reduced to less than 1 mg/l mercury. Part of the barren solution is recycled for use as the washing fluid in a second stage washing thickener. The remaining solution is recycled to the wastewater sulfide reactor.

7. The underflow solids from the first wash thickener are directed to the second stage leach, which has a retention time of at least 15 minutes, conducted at a pH=2. Acid and sodium hypochlorite are added to the second stage leach to maintain a solution potential of at least 1,000 mv. Temperatures can be between about 20° to 100° C., preferably about 50° C. Solution concentration can be between about 5 to 27% wt. sodium chloride, preferably about 10% wt.

8. The underflow product from the second stage leach is thickened in a second washing thickener. The washing fluid is a mercury barren solution obtained from the electrolysis stage. The second washing tray thickener overflow is recycled to the first washing thickener as the washing fluid. The settled underflow solids from the second washing thickener are pumped to the final dewatering stage.

9. The final dewatering of the underflow from the second washing thickener is conducted on either a vacuum or pressure filter. The washing fluid is either water or a combined sodium sulfide and water wash. The residue at this stage has less than 260 ppm Hg and less than 0.025 mg/l TCLP, which meets the EPA low mercury subcategory criteria.

10. The process illustrated in FIG. 1A can include a D009 treatment wherein the electrolytic cell overflow is treated with water, hydrochloric acid, sodium hypochlorite, D009, and the slurry is directed to the first leach.

The TCLP extractable mercury can be reduced to a level below 0.01 mg/l by incorporating a sulfide wash on the final dewatering device. The preferred method of washing would include a two-stage wash consisting of a first water wash followed by a second sodium sulfide wash. The concentration of sodium sulfide in the wash solution is not critical but it should be sufficient to ensure that an excess of about 10–20 mg/l of sodium sulfide exists in the wash filtrate. Alternatively, the sodium sulfide addition can be controlled to ensure that the solution potential of the wash filtrate is between −100 and +100 mv. The sodium sulfide wash filtrate can be directed to the sulfide reactor.

Figure 1B:
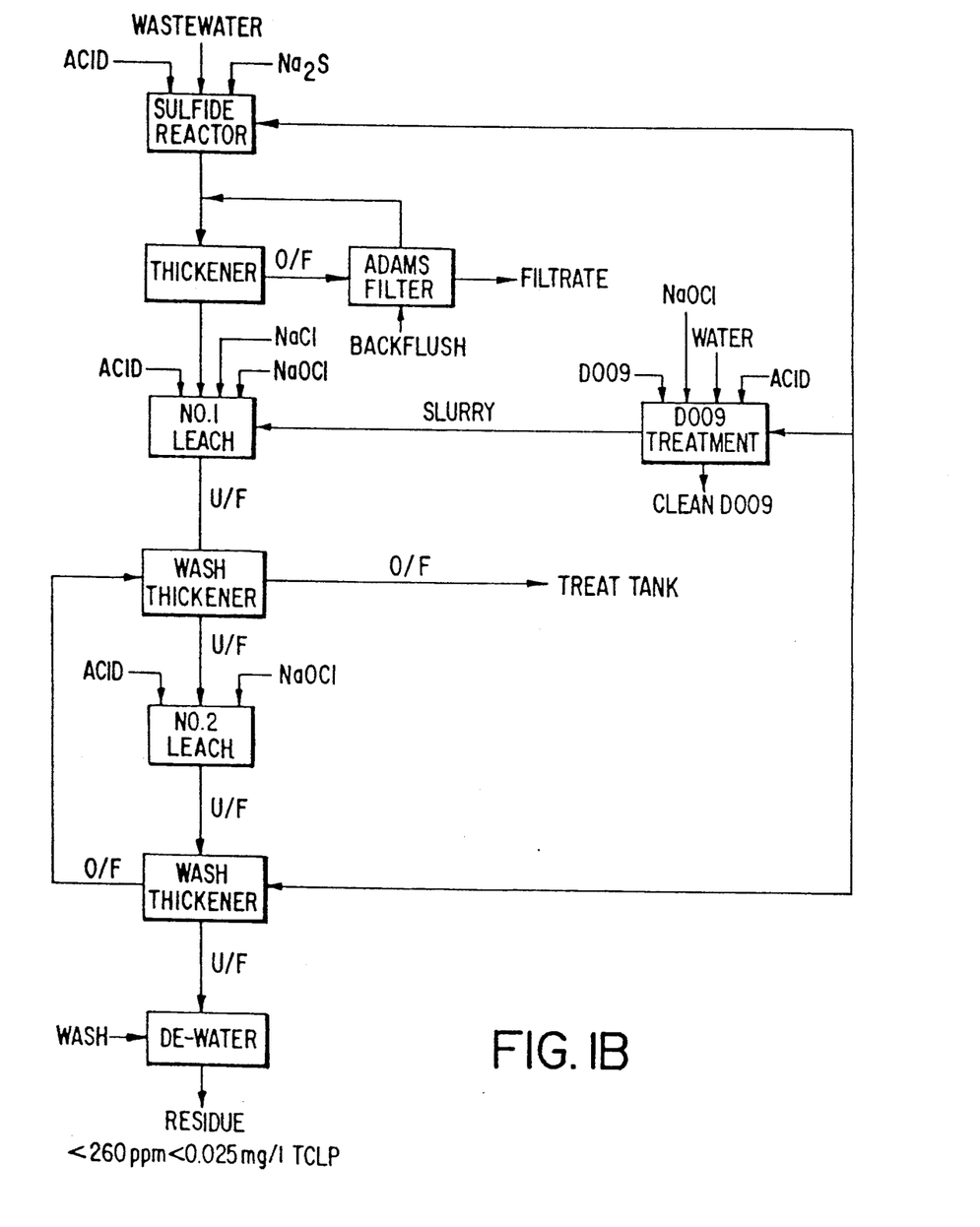
FIG. 1B represents a block diagram flow-sheet of one embodiment of the mercury mud treatment process involving two leach stages and two washing stages, and recycle of mercury containing solution to a chlor-alkali plant.

FIG. 1B represents a block diagram flow-sheet of a second embodiment of the mercury mud treatment process as described involving two leach stages and two washing stages. The overflow from the first wash thickener is directed to a treat tank where mercury is removed.

Figure 1C:
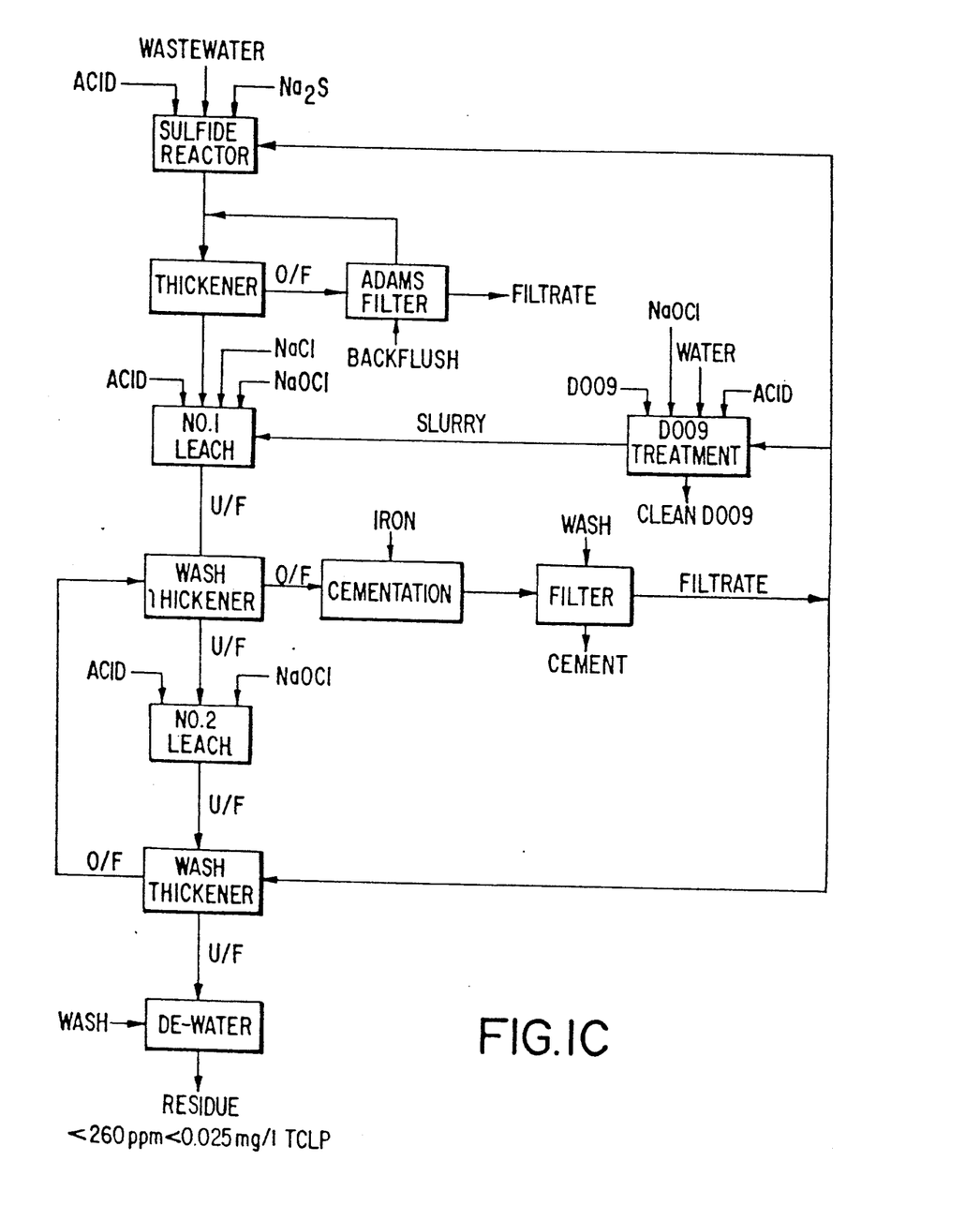
FIG. 1C represents a block diagram flow-sheet of one embodiment of the mercury mud treatment process involving two leach stages, two washing stages and removal of mercury by cementation and a filtration washing step.

FIG. 1C represents a block diagram flow-sheet of a third embodiment of the mercury mud treatment process as described involving two leach stages, two washing stages and removal of mercury from the overflow of the first wash thickener by cementation and a filtration washing step.

Figure 2A:
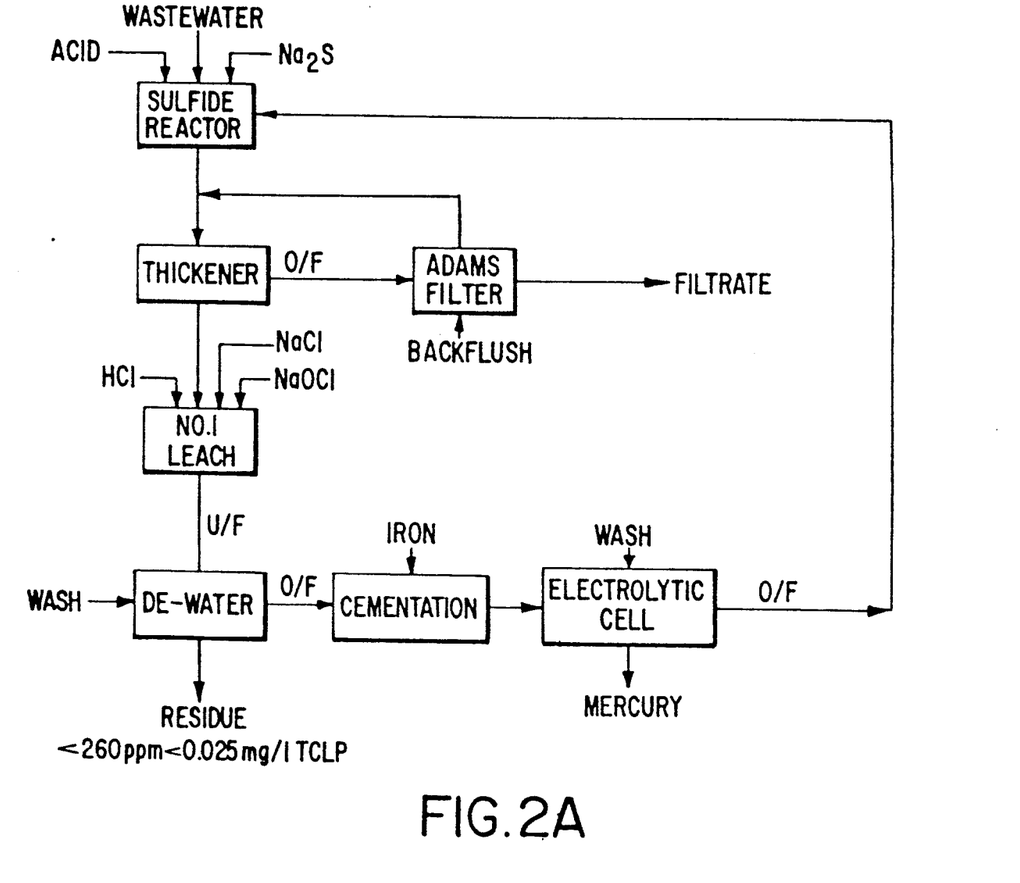
FIG. 2A represents a block diagram flow-sheet of another embodiment of the mercury contaminated material treatment process utilizing one leach step, a washing and dewatering step, and treatment of the overflow by a cementation step or electrolysis.

FIG. 2A represents a block diagram flowsheet of another embodiment of the mercury contaminated material treatment process utilizing only one leach step, a washing and dewatering step, and treatment of the overflow of the de-watering step by a cementation step and electrolysis to remove the mercury.

Figure 2B:
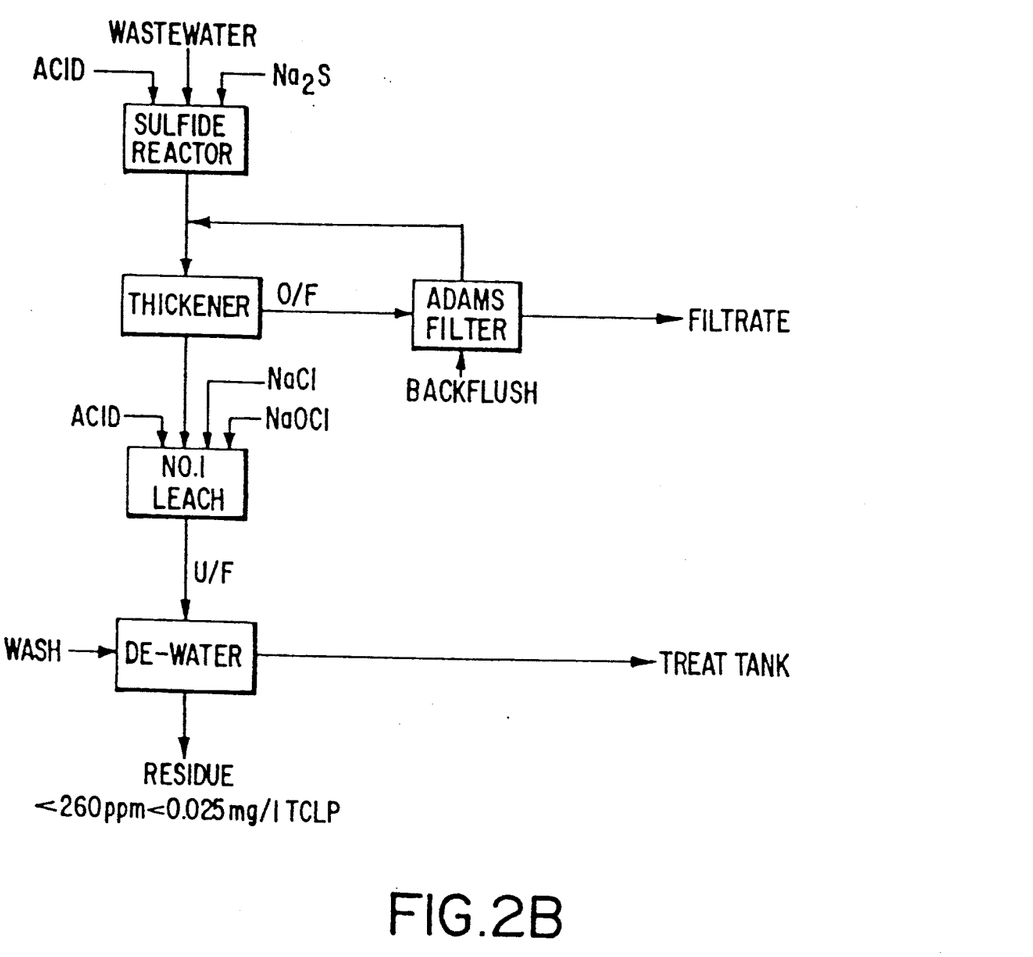
FIG. 2B represents a block diagram flow-sheet of another embodiment of the mercury contaminated material treatment process utilizing one leach step and a washing and dewatering step, and recycle of mercury containing solution to a chlor-alkali plant.

FIG. 2B represents a block diagram flowsheet of an alternative embodiment of the mercury contaminated material treatment process utilizing only one leach step and a washing and dewatering step, wherein the overflow from the de-watering step is directed to a treat tank.

Figure 2C:
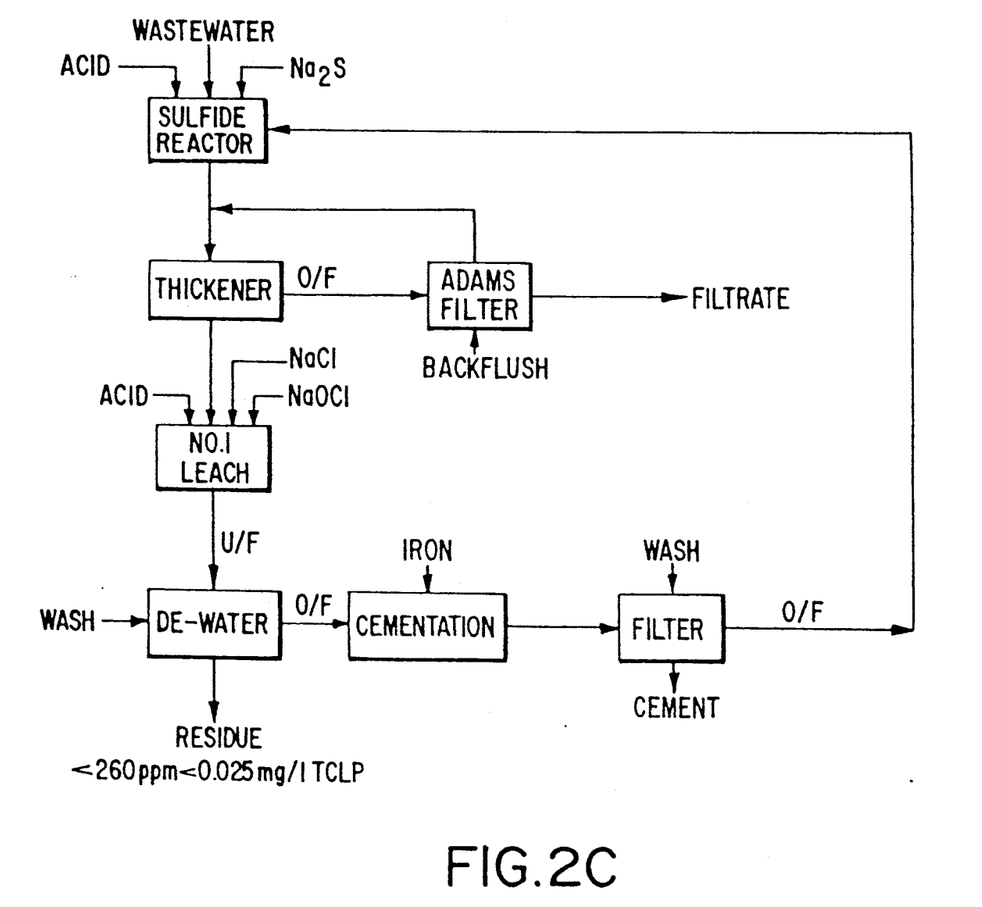
FIG. 2C represents a block diagram flow-sheet of another embodiment of the mercury contaminated material treatment process utilizing one leach step, a washing and dewatering step, and treatment of the overflow by a cementation step and a filtration washing step.

FIG. 2C represents a block diagram flowsheet of another alternative embodiment of the mercury contaminated material treatment process utilizing only one leach step, a washing and dewatering step, in which the overflow from the de-watering step is treated by a cementation step and a filtration washing step.

Figure 3:
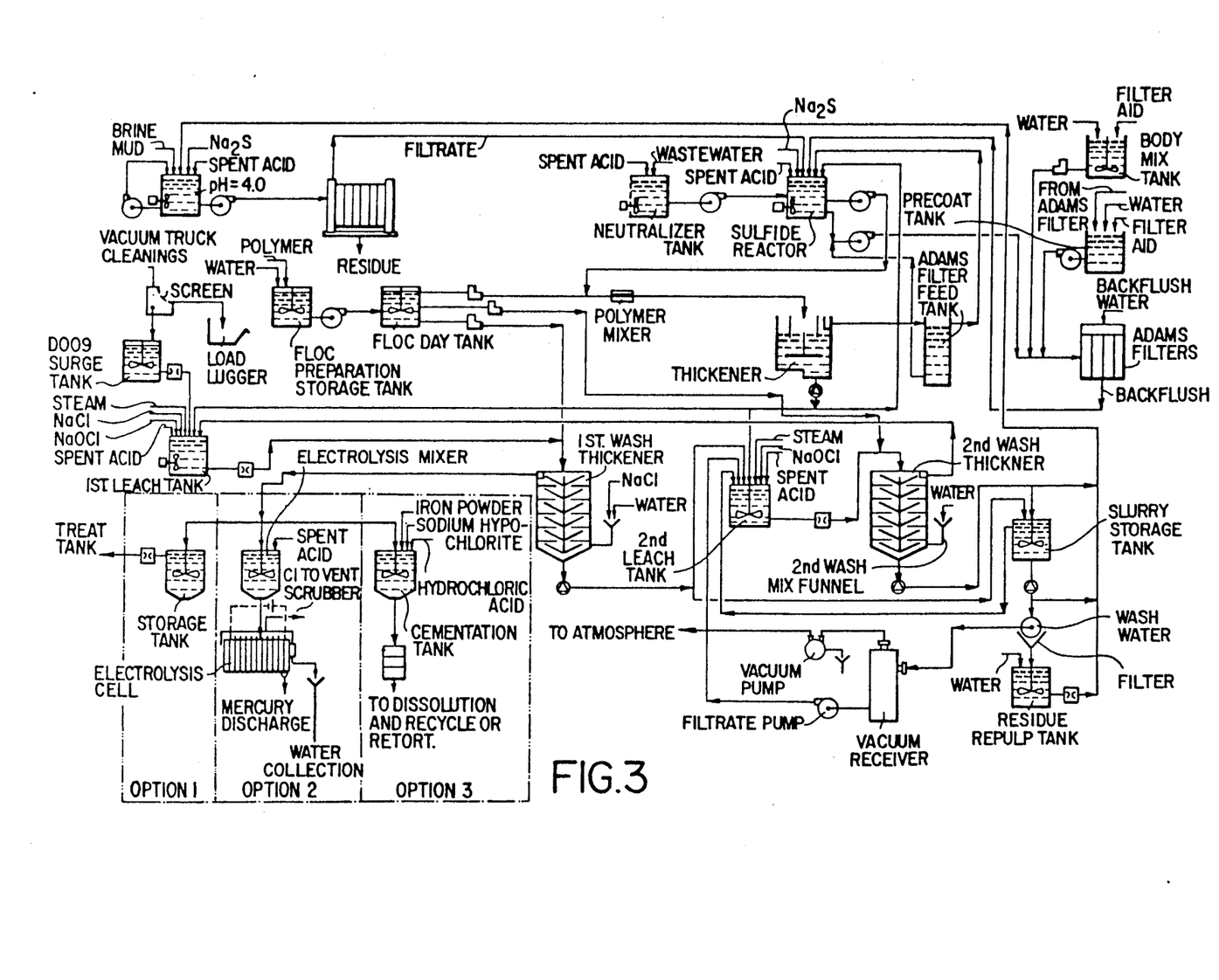
FIG. 3 represents a detailed equipment an flow line representation of the mercury mud treatment process, adapted for use with an existing chlor-alkali plant, and illustrating three optional methods of mercury treatment.

FIG. 3 illustrates an equipment-type flow-sheet representing the mercury mud treatment process of the invention. As illustrated in FIG. 3, the process is retrofitted to an existing K071 mud discharge from a conventional mercury chlor-alkali plant, comprising mixing tanks, filters, collection basins, neutralizer tanks, and a sulfide reactor treated with sodium sulfide and sulfuric acid. The discharge from the sulfide reactor is mixed with flocculant and transferred to a sulfide thickener (EIMCO Thickener). The overflow from the sulfide thickener is directed to a collection tank, and then pumped to an Adams filter. The overflow from the Adams filter is recycled to the sulfide reactor.

The underflow from the sulfide thickener is pumped to the first leach tank. Steam, salt, hydrochloric acid (spent acid) and sodium hypochlorite are added to the first leach. The product of the first leach is pumped to the No. 1 wash thickener. Flocculant from the flocculant day tank can be added to the leach product being introduced into the No. 1 wash thickener. The underflow from the No. 1 thickener is pumped to the second leach tank, where steam, sodium hypochlorite and hydrochloric acid are added.

The overflow from the No. 1 thickener is pH adjusted to about 2.0 through the addition of acid and flows to any one of three optional processes as illustrated in the three dotted line boxes, labelled Options 1, 2 and 3. Option 1 involves delivering the liquid product from the first wash thickener to a stirred storage tank, from which the stored product can be pumped to a conventional mercury treatment tank (not shown).

Option 2 involves delivering the product from the first wash thickener to an electrolysis mixing tank. The product from this tank is directed to an electrolysis cell wherein elemental mercury is produced and collected. The overflow fluid from the cell is also collected.

Option 3 involves delivering the product from the first wash thickener to a cementation mill, where iron powder, and hydrochloric acid are added. Relatively coarse iron, such as machine turnings, can be used. The iron floats on a mercury pool which is maintained in the bottom of the tank. Iron is always in contact with solution and the mercury pool. The globules of mercury which form on the dissolving iron coalesce into the mercury pool. It is therefore possible to remove solution from the reactor containing ferrous chloride but essentially no mercury. Elemental mercury can be extracted from the bottom of the reactor. No metallic iron is removed from the vessel. The product from the cementation tank (mill) is filtered and washed, which produces a mercury cement as a product. The filtrate from the filter is split, and a portion is pumped to a mixing tank to which sodium hypochlorite is added. The liquid contents of the mixing tank can be pumped to the No. 2 wash thickener. The other portion of th filtrate can be partially recycled to the process or purged to the sulfide reactor for treatment prior to disposal.

The leach product from the second leach tank is pumped to the No. 2 wash thickener. The overflow from the No. 2 thickener is recycled to the first leach tank or the No. 1 thickener to create a countercurrent flow pattern.

The underflow from the No. 2 thickener is pumped to a final dewatering device such as a vacuum filter or a filter press (not shown). The filtrate from the vacuum dewatering step is recycled to the No. 2 leach. The filter cake from the filter provides a residue which has less than 60 ppm mercury and a TCLP less than 0.025 mg/l, thereby meeting EPA treatment standards.

Figure 4:
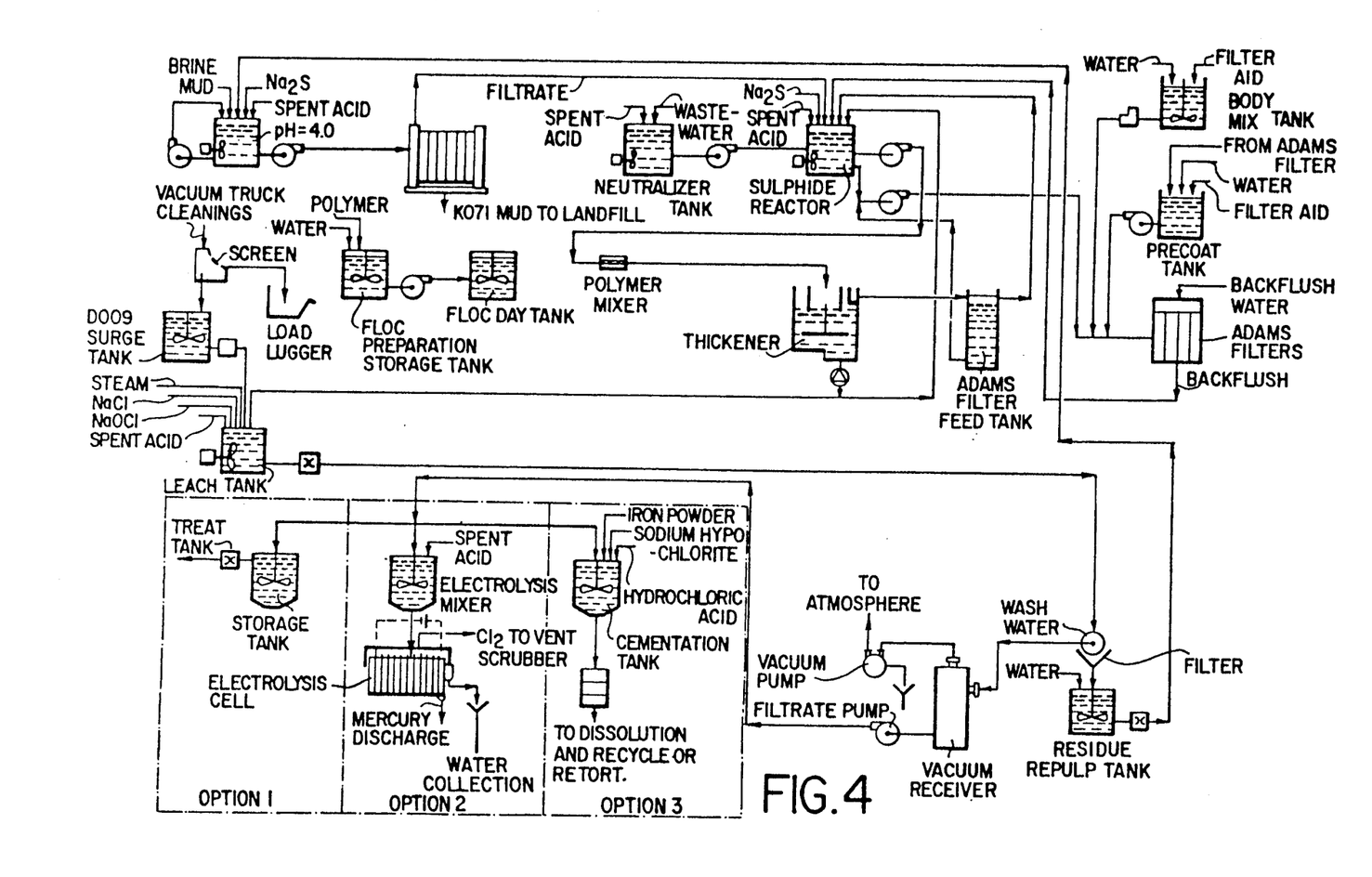
FIG. 4 represents a detailed equipment and flow line representation of the mercury mud treatment process, adapted for use with an existing chlor-alkali plant, and illustrating three optional methods of mercury treatment, without first and second wash thickeners.

FIG. 4 represents a detailed equipment and flow line representation of the mercury mud treatment process, adapted for use with an existing chlor-alkali plant, and illustrates three optional methods of mercury treatment, without the first and second wash thickener.

The process illustrated in FIG. 4 is generally similar to that shown in FIG. 3, and discussed above, except that the first wash thickening step, the second leach step and the second wash thickening step have been removed. As explained below in the experimental test results, in certain situations, the recovery of mercury may be satisfactory without the inclusion of these three steps.

The process has been tested both in the laboratory and in a continuous pilot plant at Montana College of Mineral Science and Technology, Butte, Montana, under the direction of co-inventor Larry Twidwell. Chemical analysis of the treated muds and extracts were performed at certified state laboratories. It was found that the muds from two separate chlor-alkali plants were successfully treated utilizing the process of the invention.

Test Results

A. Analysis of Source K106 Muds

Muds from two different chlor-alkali plants have been tested. An analysis of the source muds is shown in Table 1.

TABLE 1

| Sample | Test Samples Source | Type | % Hg |
|---|---|---|---|
| GP-1 | Georgia Pacific | K106 | 3.0 |
| GP-2 | Georgia Pacific | K106 | 3.3 |
| AM-1 | Georgia Pacific | Adams filter | 3.5 |
| CX-1 | Company X | K106 | 3.9 |

B. Analysis of Treated K106 Muds

Several configurations of the process of the invention have been examined. The following table provides a summary of results from the final configuration (two stage).

TABLE 2

Treated K106 Muds

| Test # | Leach Stages | Hg (ppm) (EPA 245.1) | TCLP (mg/l) (EPA 1311) | Notes |
|---|---|---|---|---|
| DT-7 | 2 | 156 | | |
| DT-8 | 2 | 88 | | |
| DT-9 | 2 | 95 | 0.076 | |
| T-11A | 2 | 86 | 0.025 | |
| T-11B | 2 | 65 | <0.010 | 1 |
| T-12A | 1 | 81 | 0.156 | |
| T-12B | 2 | 118 | 0.158 | |
| T-14A | 2 | 56 | 0.044 | |
| T-14B | 2 | 39 | <0.010 | 1 |
| T-15A | 1 | 205 | | |
| T-15B | 2 | 144 | | |
| T-16 | 2 | 73 | | |
| T-17A | 1 | 56 | 0.076 | 2 |
| T-17B | 2 | 46 | — | 2 |
| CX-1 | 1 | 180 | — | 3 |
| CX-1A | 2 | 118 | 0.124 | 3 |

Notes:
1. Stabilized with sodium sulfide.
2. Adams filter mud.
3. Company X sample.
4. Testwork conducted at:
Interwest Analytical Laboratories, Lindon, UT
Montana Bureau of Mines, Butte, MT
Mountain State Energy, Butte, MT

TABLE 3

Mercury Cement SEM/EDX (%)

| Element | % Conc. | Element | % Conc. |
|---|---|---|---|
| Hg | 35.06% | Ca | nd |
| Fe | 36.98 | Cu | nd |
| Si | 3.76 | Al | nd |
| Cl | 8.83 | K | nd |
| Na | 6.62 | Ti | nd |
| Mg | 4.53 | V | nd |
| | | Mn | nd |
| | | Sn | nd |

Notes:
1. Only elements with identifiable peaks were reported.
2. There was no indication of sulfur which, if present, is clearly identifiable with the SEM/EDX process.
3. As free mercury cannot be introduced into the SEM analyzer, the sample was baked at 120° C. for 2 hours. A significant loss of mercury could have occurred.
4. The cement was not washed.

Examples

A. Alternative Feed Materials

The parent application Ser. No. 07/875,100 described the treatment of K106 mercury mud. This material is considered to be a high mercury content feed with a total mercury content that may reach 15% but is typically 3 to 5%. Testwork has been performed on three low level wastes varying in mercury content and in species present. The materials have been designated as #1, #2, and #3. Sample #1 contains elemental mercury in a soil matrix. Sample #2 contains mercuric oxide in a clay, sand and humate matrix. Sample #3 consisted of mercuric oxide and mercuric chlorides in combination with diatomaceous earth and sand.

B. One versus Two-Stage Leaching

The three materials described above were leached under the leaching conditions that had proven optimal for the K106 treatment, i.e., pH=5–6 in the first stage, pH=2–3 in the second stage (if used) ORP>1000 mv and the retention time maintained at one hour. The use of elevated temperatures was not examined. The leach performance is demonstrated in Table 4. The results indicate that for these low mercury streams there is little further reduction in the residue mercury content achieved in a two-stage leach, compared to a single stage leach.

TABLE 4

Alternative Feeds Residue and Feed Analysis

| Sample No. | MERCURY TOTAL mg/kg | | | Recovery (%) |
|---|---|---|---|---|
| | Head | Single-Stage | Two-Stage | |
| 1 | 172 | 21.63 | 17.64 | 89.74 |
| 2 | 34.9 | 8.72 | 4.17 | 88.05 |
| 3 | 65.3 | 3.92 | 3.54 | 94.59 |

C. Residue Washing

The counter-current washing tray thickener displaces the mercury laden brine accompanying the leach residue with a brine solution containing 10 to 15% wt. sodium chloride. The thickener underflow can then be dewatered and water washed to achieve the required final residue mercury content. The tray thickener can be replaced in the flowsheet by a washing filter such as filter press or vacuum filter. It is essential, however, that the two-stage wash is utilized since washing the leach residue directly with water will cause the precipitation of mercury into the residue, resulting in an unacceptably high mercury content. The comparison of a two-stage versus single-stage wash is shown in Table 5. In each case two trials were made.

TABLE 5

Residue Content After Washing

| Wash Technique | Residue (mg/kg) |
|---|---|
| Unwashed residue | 2070 |
| Single Repulp in de-ionized water | 1439, 1583 |
| Above residue washed with 10% NaCl | 70, 78 |
| Single Repulp in 10% NaCl | 194, 184 |

D. Alternative Recovery Schemes for Mercury

The recovery of mercury by electrolysis is demonstrated in Table 6. The electrolytic cell used a titanium substrate electrode coated with ruthenium oxide (chlorine generator) and a liquid mercury cathode. The anode surface area was 51.8 cm². Other testwork has shown that given sufficient retention time, the mercury can be reduced to 2 mg/L. The electrolysis was performed on a pilot plant generated leach solution.

TABLE 6

Mercury Electrolysis

| Time (min) | Mercury (mg/L) | Voltage (V) | Current (mA) | Density (A/ft²) |
|---|---|---|---|---|
| 0 | 2070 | 1.7 | 140 | 2.5 |
| 15 | 1805 | 1.7 | 140 | 2.5 |
| 30 | 1504 | 1.7 | 140 | 2.5 |
| 60 | 1000 | 1.7 | 140 | 2.5 |
| 120 | 465 | 3 | 140 | 2.5 |
| 240 | 333 | 2 | 26 | 0.5 |

TABLE 6-continued

| | Mercury Electrolysis | | | |
|---|---|---|---|---|
| Time (min) | Mercury (mg/L) | Voltage (V) | Current (mA) | Density (A/ft$^2$) |
| 360 | 270 | 2 | 17 | 0.3 |

E. Cementation

The parent application Ser. No. 07/875,100 teaches the use of cementation in a rotary contacting device such as a ball mill. A coarse iron scrap powder could be used to remove mercury from solution. Abrasion of the iron particles produces a fine powder product containing mercury and iron in about equal parts by weight. Cominco, in U.S. Pat. No. 5,013,358, Ball et al., teaches the use of a coalescence column of mercury to separate the mercury from the iron and thus allow recovery of clean mercury. This technique appears to have a problem involving difficult separation of the unreacted iron from the mercury surface of the coalescence column. We have discovered that the concepts of coalescence and cementation can be beneficially combined in a single step. The contactor can be either a mix tank or a rotating mill. A three-phase system is operated, consisting of a lower mercury pool, an aqueous phase containing the soluble mercuric chloride and coarse iron. The procedure has been performed with both iron powder and machine turnings. The turnings are preferred because of the ease with which they can be maintained within the reactor. A leach solution was fed continuously into a rotating contactor containing 300 mL of solution and 50 grams of iron turnings and 30 mL of mercury. The solution was delivered at a rate that resulted in a retention time of 10 minutes in the reactor. The solution was reduced from 3,000 mg/L to 10 mg/L. Upon completion of the test, the iron was revealed to have essentially no mercury adhering to it. The mercury pool remained bright, indicating high purity.

Benefits

This improved process in its various embodiments offers the following benefits:

(a) The process provides the ability to treat highly contaminated muds (K106) and soils to the levels of <260 ppm total mercury and <0.025 mg/l TCLP.

(b) Reduction in TCLP mercury to <0.010 mg/l can be accomplished through the incorporation of a sodium sulfide wash.

(c) The process provides an extracted elemental mercury product that is suitable for immediate re-use or can be easily refined by low temperature triple distillation.

(d) Mercury can alternatively be recovered from solution in the liquid form by electrolysis.

(e) The process provides a technology that is protective of human health and the environment. Mercury is extracted from low grade feed without the need for elevated temperature such as with retorting, thereby running the risk of losing mercury to the atmosphere.

(f) The process is particularly adapted for use on chlor-alkali plants waste products and can be readily retro-fitted to existing chlor-alkali plants. Most of the chemicals used in the liquid state process are readily available to chlor-alkali operations. The process itself is similar to that used in the treatment of K071 muds. Materials and methods are familiar to chlor-alkali plant operators thus reducing the risk of accidents and unwanted release.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A hydrometallurgical process for the removal of mercury and mercury compounds from solid materials containing mercury and mercury compounds comprising:
   (a) treating the solid materials in a leach with acid, sodium chloride and sodium hypochlorite for a sufficient length of time to produce a leached product having a reduced mercury and mercury compound content and a byproduct having an elevated mercury and mercury compound content; and
   (b) washing and de-watering the leached product to yield a residue which is low in mercury content, and a wash fluid which is delivered to a treating tank.

2. A process as claimed in claim 1 wherein the solid materials are thickened before being directed to the leach.

3. A process as claimed in claim 1 wherein the wash fluid is treated with iron to form a cementation product and the cementation produce is washed in a filter to yield a cement and an overflow product which is recycled to the lead.

4. A process as claimed in claim 1 wherein the wash fluid is treated with iron to form a cementation product which is passed through an electrolytic cell to yield elemental mercury and an overflow product which is recycled to the leach.

5. A hydrometallurgical process for the removal of mercury and mercury compounds from solid materials containing mercury and mercury compounds comprising:
   (a) treating the solid materials in a first leach with acid, sodium chloride and sodium hypochlorite for a sufficient length of time to produce a first leached product having a reduced mercury and mercury compound content and a first by-product having an elevated mercury and mercury compound content;
   (b) transferring the first leached product from the first leach to a first wash thickener and thickening the first leached product from the first leach to generate a first thickened product and an overflow product; and
   (c) transferring the overflow product from the first wash thickener to an electrolytic cell to yield elemental mercury and an overflow which is recycled to the first leach.

6. A process as claimed in claim 5 further comprising:
   (d) directing the first thickened product from the first wash thickener to a second leach, wherein the first thickened product is treated with acid and sodium hypochlorite for a sufficient length of time to produce a second leached product having a reduced mercury and mercury compound content and a second by-product having an elevated mercury and mercury compound content;
   (e) transferring the second leached product to a second wash thickener wherein the second leached product is thickened to generate a second thickened product and an overflow product; and (f) transferring the second thickened product to a final dewatering process to yield a low mercury content residue.

7. A process as claimed in claim 5 wherein the overflow product form the first wash thickener is transferred to a treating tank.

8. A process as claimed in claim 6 wherein the overflow product from the second wash thickener is recycled to the first wash thickener.

9. A process as claimed in claim 6 wherein the overflow product from the first wash thickener is treated with iron, an then filtered, to yield a mercury containing cement.

10. A process as claimed in claim 9 wherein the overflow product from the second wash thickener is recycled to the first wash thickener.

11. A process as claimed in claim 1 wherein the solid materials containing mercury and mercury compounds are first passed through a preliminary thickener before being transferred to the leach in order to produce a primary overflow product which is recycled to the preliminary thickener.

12. A process as claimed in claim 11 wherein the primary overflow product from the preliminary thickener is filtered and backflushed to produce a filtered product which is recycled to the preliminary thickener.

13. A process as claimed in claim 3 wherein the solid materials containing mercury and mercury compounds are first passed through a preliminary thickener before being transferred to the leach in order to produce a primary overflow product which is recycled to the preliminary thickener.

14. A process as claimed in claim 13 wherein the primary overflow product form the preliminary thickener is filtered and backflushed to produce a filtered product which is recycled to the preliminary thickener.

15. A process as claimed in claim 5 wherein the solid materials containing mercury and mercury compounds are first passed through a preliminary thickener before being transferred to the leach in order to produce a primary overflow product which is recycled to the preliminary thickener.

16. A process as claimed in claim 15 wherein the primary overflow product from the preliminary thickener is filtered and backflushed to produce a filtered product which is recycled to the preliminary thickener.

17. A process as claimed in claim 1 wherein the leach has a retention time of at least about 15 minutes, said leach being conducted at a pH of about 6, and a solution potential of at least about 900 mv, the leach comprising at least about 5 percent by weight sodium chloride.

18. A process as claimed in claim 6 wherein the first leach has a retention time of at least about 15 minutes, said first leach being conducted at a pH of about 6, and a solution potential of at least about 900 mv, the first leach comprising at least about 5 percent by weight sodium chloride therein, and the second leach has a retention time of at least about 15 minutes, said second leach being conducted at a pH of about 2, and a solution potential of at least about 700 mv, the second leach comprising at least about 5 percent by weight sodium chloride.

19. A hydrometallurgical process for the removal of mercury and mercury compounds from solid and liquid materials containing mercury and mercury compounds comprising:

(a) treating the solid and liquid materials in a sulfide reactor with acid and sodium sulfide to produce a reaction product;
(b) transferring the reaction product from the sulfide reactor to a preliminary thickener to produce a thickened product;
(c) transferring the thickened product form the preliminary thickener to a first leach, to which is added acid and sodium hypochlorite to produce a first leached product; and
(d) washing and dewatering the first leached product for the first leach to yield an overflow product.

20. A process as claimed in claim 19 wherein the overflow product is transferred to an electrolytic cell to yield elemental mercury.

21. A process as claimed in claim 19 wherein the overflow product is treated with iron to form a cementation product which is then filtered to yield a cement that is high in mercury content.

22. A process as claimed in claim 19 further comprising:

(d) transferring the first leached product from the first leach to a first wash thickener to produce a first wash thickened product;
(e) transferring the first wash thickened product from the first wash thickener to a second leach, to which is added acid and sodium hypochlorite to produce a second leached product;
(f) transferring the second leached product from the second leach to a second wash thickener to produce a second wash thickened product; and
(g) washing and dewatering the second wash thickened product from the second wash thickener to yield a low mercury content residue.

23. A process as claimed in claim 20 further comprising:

(d) transferring the first leached product from the first leach to a first wash thickener to produce a first wash thickened product;
(e) transferring the first wash thickened product from the first wash thickener to a second leach, to which is added acid and sodium hypochlorite to produce a second leached product;
(f) transferring the second leached product from the second leach to a second wash thickener to produce a second wash thickened product; and
(g) washing and dewatering the second wash thickened product from the second wash thickener to yield a low mercury content residue.

24. A process as claimed in claim 21 further comprising:

transferring the first leached product from the first leach to a first wash thickener to produce a first wash thickened product;
(e) transferring the first wash thickened product from the first wash thickener to a second leach, to which is added acid and sodium hypochlorite to produce a second leached product;
(f) transferring the second leached product from the second leach to a second wash thickener to produce a second wash thickened product; and
(g) washing and dewatering the second wash thickened product from the second wash thickener to yield a low mercury content residue.

25. A process as claimed in claim 22 wherein the second wash thickener generates an overflow product which is transferred to the first wash thickener.

26. A process as claimed in claim 22 wherein the first wash thickener generates an overflow product which is treated with iron in a cementation process and filtered in a filter to yield a mercury containing cement and filtrate, at least a part of the filtrate being transferred to the second wash thickener.

27. A process as claimed in claim 20 wherein the preliminary thickener generates an overflow product which is transferred to a backflushed filter to produce a filtered product, the filtered product from the filter being returned to the preliminary thickener.

28. A process as claimed in claim 1 wherein the acid is selected from the group consisting of hydrochloric acid and sulfuric acid.

29. A process as claimed in claim 1 wherein sodium chloride is added to the leach to cause an increase in solubility of the mercury and mercury compounds.

30. A process as claimed in claim 1 wherein sodium chloride is added to the leach to maintain a sodium chloride level in the leach of between about 5 to 27 percent by weight.

31. A process as claimed in claim 6 wherein sodium chloride is added to the second leach to cause an increase in solubility of the mercury and mercury compounds.

32. A process as claimed in claim 6 wherein sodium chloride is added to the second leach to maintain a sodium chloride level in the second leach of between about 5 to 27 percent by weight.

33. A process as claimed in claim 19 wherein the first leach has a retention time of at least about 15 minutes, said first leach being conducted at a pH of about 6, a solution potential of at least about 900 mv and a temperature between about 20° to 100° C., the first leach comprising at least about 5 percent by weight sodium chloride.

34. A process as claimed in claim 22 wherein the second leach has a retention time of at least about 15 minutes, said second leach being conducted at a pH of about 2, a solution potential of at least about 700 mv and a temperature between about 20° to 100° C., the second leach comprising at least about 5 percent by weight sodium chloride.

35. A process as claimed in claim 20 wherein sodium chloride is added to the first leach to cause an increase in solubility of the mercury and mercury compounds.

36. A process as claimed in claim 20 wherein sodium chloride is added to the first leach to maintain a sodium chloride level in the first leach of between about 5 to 27 percent by weight.

37. A process as claimed in claim 23 wherein sodium chloride is added to the second leach to cause an increase in solubility of the mercury and mercury compounds.

38. A process as claimed in claim 24 wherein sodium chloride is added to the second leach to maintain a sodium chloride level in the second leach of between about 5 to 27 percent by weight.

39. A hydrometallurgical process for the removal of mercury and mercury compounds from solid and liquid materials containing mercury and mercury compounds comprising:
(a) treating the solid and liquid materials in a first leach with acid, sodium chloride and sodium hypochlorite for at least about 15 minutes, the first leach containing at least about 5 percent by weight sodium chloride, the treating of the solid and liquid materials in the first leach being conducted at a pH of about 6, a solution potential of at least about 900 mv, and a temperature between about 20° to 100° C. to produce a first leached product having a reduced mercury and mercury compound content and a first by-product containing mercury and mercury compounds; and
(b) transferring the first leached product to a dewatering processor to yield a residue having less than about 260 ppm mercury content and an overflow product.

40. A process as claimed in claim 39 further comprising:
transferring the first leached product to a first wash thickener wherein the first leached product is thickened to produce a first thickened product;
(e) transferring the first thickened product from the first wash thickener to a second leach and treating the first thickened product therein with acid and sodium hypochlorite for at least about 15 minutes, the second leach containing at least about 5 percent by weight sodium chloride, with the treating of the first thickened product in the second leach being conducted at a pH of about 2, a solution potential of at least about 700 mv, and a temperature between about 20° to 100° C. to produce a second leached product having a further reduced mercury and mercury compound content and a second by-product containing mercury and mercury compounds; and
(f) transferring the second leached product to a second wash thickener and thickening the second leached product to produce a second thickened product which is transferred to a final dewatering process to yield a residue having a mercury and mercury compound content of less than about 260 ppm total mercury.

41. A process as claimed in claim 40 wherein the acid in the first leach and the second leach is selected from the group consisting of hydrochloric acid and sulfuric acid.

42. A process as claimed in claim 41 wherein sodium chloride is added to the first leach and the second leach to maintain a sodium chloride concentration of the first leach and the second leach at about 10 percent by weight.

43. A process as claimed in claim 42 wherein the temperature of the first leach and the second leach is about 50° C.

44. A hydrometallurgical process for the removal of mercury and mercury compounds from solid materials containing mercury and mercury compounds comprising:
(a) thickening the solid materials to produce a thickened product;
(b) treating the thickened product in at least one leach with acid and sodium hypochlorite for a sufficient length of time to produce a leached product having a reduced mercury and mercury compound content and a by-product having an elevated mercury and mercury compound content;
(c) transferring the leached product from the leach to a dewatering process to yield a low mercury content residue and an overflow product; and
(d) treating the overflow product from the dewatering process with iron to yield a cement.

45. A process as claimed in claim 39 further comprising the step of:

(c) treating the overflow product from the dewatering processor with iron to form a cement.

46. A process as claimed in claim 39 further comprising the step of:

(c) transferring the overflow product from the dewatering processor to an electrolytic cell to yield elemental mercury.

47. A hydrometallurgical process for the removal of mercury and mercury compounds from solid materials containing mercury and mercury compounds comprising:

(a) thickening the solid materials to produce a thickened product;

(b) treating the thickened product in at least one leach with acid and sodium hypochlorite for a sufficient length of time to produce a leached product having a reduced mercury and mercury compound content and a by-product having an elevated mercury and mercury compound content;

(c) transferring the leached product from the leach to a dewatering process to yield a low mercury content residue and an overflow product; and (d) directing the overflow product to an electrolytic cell.

* * * * *